Figure 1:
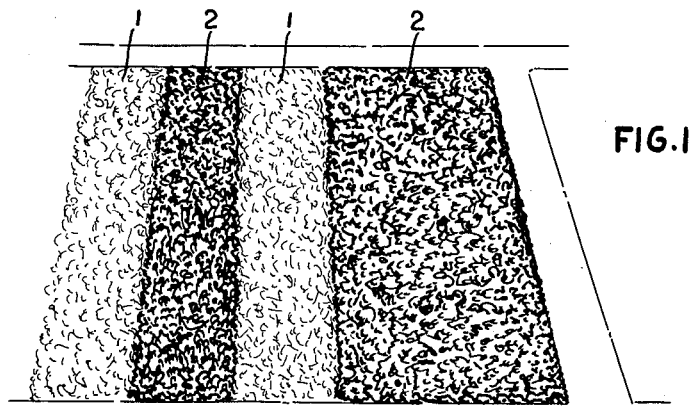

March 6, 1956 G. SCHUMACHER ET AL 2,736,991
METHOD OF TREATING AND MARKING OUT
TRACTS OF LAND FROM AIRCRAFT
Filed Dec. 8, 1952

INVENTORS.
G. Schumacher &
G. Haronska
By Bryant & Lowry
Atty.

United States Patent Office 2,736,991
Patented Mar. 6, 1956

2,736,991

METHOD OF TREATING AND MARKING OUT TRACTS OF LAND FROM AIRCRAFT

Gustav Schumacher and Gerd Haronska, Bonn, Germany

Application December 8, 1952, Serial No. 324,769

1 Claim. (Cl. 47—58)

The present invention relates to means for the marking of areas or strips of land as a guide to flying aircraft and has for an object to provide an improved, simpler and less expensive method for the above purpose.

In the fight against parasites and the like on all manner of vegetation the use of a spray carried by an aircraft to treat affected areas or to protect those endangered is well known. Thus fields, woods, vineyards and the like are often treated by means of a low flying aircraft which sprays the areas in question with a suitable solution. It has been found, however, that the aircraft has frequently to leave its areas of operation to return to base for re-fuelling and to replenish its stocks of spray solution. This necessitates a considerable and costly ground organization on the land under treatment to enable the pilot returning from base to continue spraying where he left off. To distinguish the treated tracts of land from those awaiting treatment various visual markers are employed such as flags, balloons, smoke from fires or smoke shells and the like in different colours and sizes. All these visual indicators must constantly be placed and moved, thus necessitating the use of a considerable ground labor force and costly materials, not to mention an extensive loss of actual flying time while the markers are being positioned.

A further object of the invention is to avoid the disadvantages of the aforementioned orthodox methods for marking out land areas in that the ground markers are placed directly from the aircraft during flight by dropping such marking matter which remains visible on the ground when dropped by the crew of the aircraft.

A further object of the invention is to deliver or drop the ground marking material from an aircraft during flight either over the entire width of the aircraft or on one or both sides thereof in the pattern of a small strip or line or of points, the marking of the ground being accomplished simultaneously with the actual spraying from the same aircraft, and which method eliminates the necessity of additional personnel for ground marking.

A still further object of the invention is to utilize a coloring matter as a suitable marker to be dropped by the aircraft or separately from or combined with the treatment spray, and when the marking material is discharged separately from the treatment spray it can be dropped on either side of the aircraft.

A still further object of the invention is to utilize solid material as a marking medium for a field to indicate to the pilot of the aircraft such areas as have been sprayed and such solid material may comprise metal shavings, metal dust, wood shavings or the like and, if desired, the wood shavings could be colored for more readily distinguishing a marking line.

With the above and other objects in view that will become apparent as the nature of the invention is better understood, the same consists in the novel form, combination and arrangement of parts hereinafter more fully described, shown in the accompanying drawing, and particularly claimed.

Figure 2:
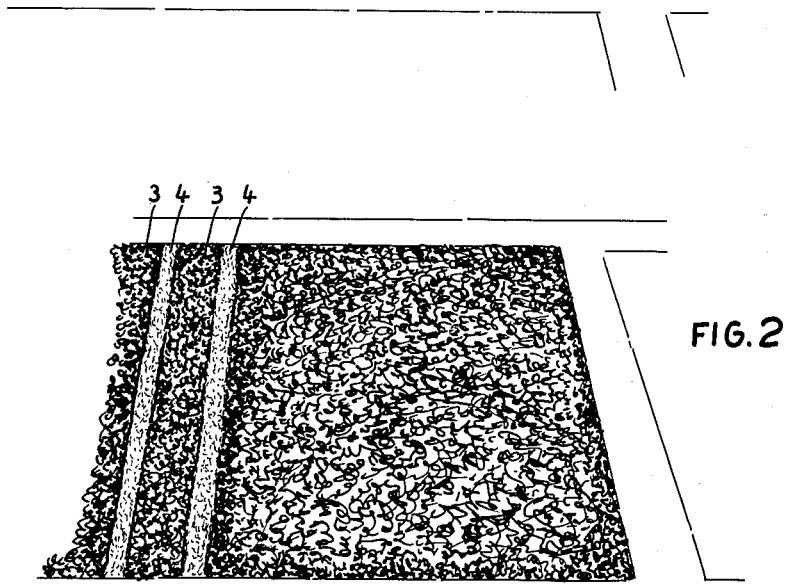

The accompanying drawing shows two different methods of marking a field from the air in accordance with the present invention, and on said drawing, Figure 1 is a diagrammatic plan view of a treat of land showing marking material combined with spray material dropped by the aircraft as being of a width comparable with the aircraft, the marked strips presenting a color different from the land not treated, and Figure 2 is a diagrammatic plan view of a tract of land and shows the marking of a line on the edge of treated or sprayed strips of land.

As illustrated in Figure 1, the tract of land has two relatively wide spaced strips 1 that are distinguished from the areas marked 2 and said strips 1 were sprayed with colouring or marking material added to the spray from the aircraft and the material sprayed or dropped may comprise the treatment material alone or the treatment material with the marking matter combined therewith so that when a run of the field has been made by the pilot of the aircraft, it can be readily determined from the air just what area of the ground tract has been treated, the areas 1 being clearly distinguishable from the areas 2. As illustrated in Figure 1, the treatment material alone or the treatment material with the marking material combined therewith is sprayed or dropped from the aircraft over the entire width of the aircraft.

In the method employed in the treatment of a tract of land as illustrated in Figure 2, the areas indicated by the reference characters 3 have had the treatment material dropped or sprayed thereon and the narrow strips 4 indicate marking material only so that when a pilot has sprayed a certain area of the ground, he will border such area with a relatively narrow marking strip 4.

As before stated, the colouring or marking matter may be dropped independently of the treatment material or liquid, or the colouring matter may be mixed with the liquid treatment material and sprayed. The colouring matter mixed with a liquid or powder to be sprayed would unmistakably indicate to the pilot which tracts of land had been sprayed and would show a clear dividing line between sprayed and unsprayed tracts.

The foregoing results could be obtained by dropping a foamy or lathering substance either continuously or in blobs spaced at regular intervals. It is also contemplated that material could be employed which would produce an artificial fog. It is likewise intended to utilize a neutral or coloured gas in containers that would break when striking the ground to indicate what areas of a field had been treated.

From the above detailed description of the invention, it is believed that the method disclosed herein will at once be apparent, and it is intended that such method be extended beyond the treatment of land for the extermination of parasites and the like and to reach into various other arts, such as sowing, manuring, map photography and the like.

What is claimed as new, is:

A method of spraying and marking out tracts of land for the treatment of vegetation, soil and other purposes, consisting of dropping from flying aircraft by spraying a treatment substance and simultaneously dropping from the aircraft by spraying a stable foamy marking material having a color contrasting to the color of the treatment substance at the border of the treated area that remains visible on the ground to the crew of the aircraft.

References Cited in the file of this patent

UNITED STATES PATENTS

| 1,501,427 | Wilson | July 15, 1924 |
| 2,356,119 | Quick | Aug. 15, 1944 |
| 2,426,771 | Harp | Sept. 2, 1947 |

(Other references on following page)

| | UNITED STATES PATENTS | | |
|---|---|---|---|
| 2,504,247 | Bowman | Apr. 18, 1950 |
| 2,504,580 | Pierson | Apr. 18, 1950 |

FOREIGN PATENTS

| 106,441 | Australia | Jan. 18, 1939 |
|---|---|---|
| 890,107 | France | Oct. 25, 1943 |
| 488,479 | Germany | Dec. 28, 1929 |
| 486,113 | Great Britain | May 27, 1938 |

OTHER REFERENCES

Ser. No. 340,363, Lowenstein (A. P. C.), published April 27, 1943.